(12) United States Patent
Pan

(10) Patent No.: US 12,465,080 B2
(45) Date of Patent: Nov. 11, 2025

(54) ELECTRONIC VAPORIZATION DEVICE AND POWER SUPPLY ASSEMBLY THEREOF

(71) Applicant: SHENZHEN SMOORE TECHNOLOGY LIMITED, Guangdong (CN)

(72) Inventor: Zhiwen Pan, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 444 days.

(21) Appl. No.: 18/079,301

(22) Filed: Dec. 12, 2022

(65) Prior Publication Data

US 2023/0180828 A1 Jun. 15, 2023

(30) Foreign Application Priority Data

Dec. 15, 2021 (CN) .......................... 202123155151.9

(51) Int. Cl.
*A24F 40/40* (2020.01)
*A24F 40/10* (2020.01)
*A24F 40/50* (2020.01)
*A24F 40/51* (2020.01)
*A24F 40/53* (2020.01)
*H02J 7/00* (2006.01)

(52) U.S. Cl.
CPC ............. *A24F 40/40* (2020.01); *A24F 40/10* (2020.01); *A24F 40/50* (2020.01); *A24F 40/51* (2020.01); *A24F 40/53* (2020.01); *H02J 7/00712* (2020.01); *H01M 2220/30* (2013.01); *Y02E 60/10* (2013.01)

(58) Field of Classification Search
None
See application file for complete search history.

(56) References Cited

U.S. PATENT DOCUMENTS

| 2018/0303166 A1* | 10/2018 | Qiu | ........................ A61M 15/06 |
| 2021/0298356 A1* | 9/2021 | Qiu | ........................... A24F 7/00 |
| 2022/0273035 A1* | 9/2022 | Yao | .......................... A24F 40/42 |

(Continued)

FOREIGN PATENT DOCUMENTS

| CN | 208510076 U | * | 2/2019 | ............. A24F 40/40 |
| CN | 110495646 A | | 11/2019 | |
| CN | 210611027 U | | 5/2020 | |

(Continued)

OTHER PUBLICATIONS

CN208510076U English Translation obtained from Espacenet, pp. 1-23 (Year: 2019).*

(Continued)

*Primary Examiner* — Philip Y Louie
*Assistant Examiner* — Madeleine P Delacruz
(74) *Attorney, Agent, or Firm* — Leydig, Voit & Mayer, Ltd.

(57) ABSTRACT

A power supply assembly includes: a first mounting hole for mounting a magnetic member, an inner wall of the first mounting hole being provided with a vent groove; and an airflow sensor in air communication with the vent groove. In an embodiment, the power supply assembly is provided with a mounting groove and the airflow sensor is mounted in the mounting groove.

20 Claims, 2 Drawing Sheets

(56) References Cited

U.S. PATENT DOCUMENTS

2023/0091872 A1* 3/2023 Qiu .......................... A24F 7/00
                                                         131/329

FOREIGN PATENT DOCUMENTS

| CN | 211746997 U   | 10/2020 |
|----|---------------|---------|
| CN | 112890291 A   | 6/2021  |
| WO | 2020034771 A1 | 2/2020  |
| WO | 2021184943 A1 | 9/2021  |
| WO | 2021238625 A1 | 12/2021 |

OTHER PUBLICATIONS

Japanese Patent Office, Notice of Reasons for Refusal in Japanese Patent Application No. 2022-159867 (Nov. 21, 2023).
European Patent Office, Search Report in European Patent Application No. 22212998.3 (May 23, 2023).

* cited by examiner ated to Chinese Patent Application No.
ELECTRONIC VAPORIZATION DEVICE AND POWER SUPPLY ASSEMBLY THEREOF

CROSS-REFERENCE TO PRIOR APPLICATION

Priority is claimed to Chinese Patent Application No. 202123155151.9, filed on Dec. 15, 2021, the entire disclosure of which is hereby incorporated by reference herein.

FIELD

The present utility model relates to the field of vaporization technologies, and in particular, to an electronic vaporization device and a power supply assembly thereof.

BACKGROUND

An electronic vaporization device vaporizes a vaporization substrate through a vaporization assembly to generate an aerosol for a user to inhale, so as to achieve an objective of obtaining a substance in the aerosol. A power supply assembly is configured to supply power to the vaporization assembly to control the vaporization assembly to perform vaporization or stop vaporization. Generally, the power supply assembly includes a microphone for detecting an airflow generated by inhaling performed by the user. When detecting that the user is inhaling, the microphone causes the power supply assembly to supply power to the vaporization assembly, that is, starting the electronic vaporization device. The power supply assembly needs to provide a start airway connected to the microphone. Because the start airway needs to occupy a lot of space, it is not conducive to the miniaturization and flat design of a product.

SUMMARY

In an embodiment, the present invention provides a power supply assembly, comprising: a first mounting hole configured to mount a magnetic member, an inner wall of the first mounting hole being provided with a vent groove; and an airflow sensor in air communication with the vent groove.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
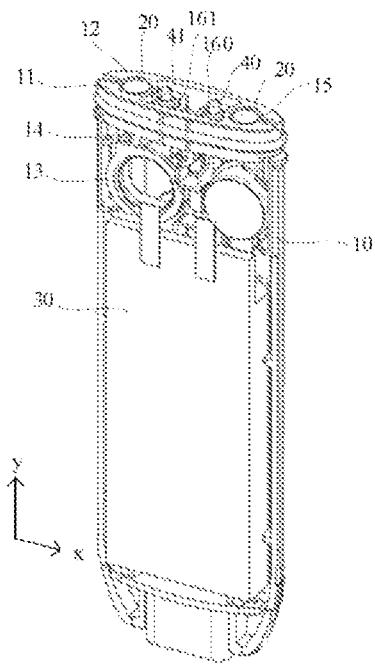
FIG. 1 is a schematic structural diagram of a power supply assembly according to an embodiment of the present utility model.

In an embodiment, the present invention provides an electronic vaporization device and a power supply assembly thereof that improve the foregoing defects to resolve a problem that a start airway on the power supply assembly in the related art occupies a relatively large space, which is not conducive to the miniaturization and flat design of a product.

A power supply assembly includes a first mounting hole configured to mount a magnetic member, where an inner wall of the first mounting hole is provided with a vent groove; and the power supply assembly includes an airflow sensor, and the airflow sensor is in air communication with the vent groove. In one of the embodiments, the power supply assembly is provided with a mounting groove, and the airflow sensor is mounted in the mounting groove.

In one of the embodiments, the power supply assembly includes a communication member, and the communication member is arranged between the mounting groove and the vent groove.

In one of the embodiments, the communication member is provided with a vent hole, one end of the vent hole is in communication with the mounting groove, an other end of the vent hole is in communication with the first mounting hole, and the vent hole is in communication with the vent groove.

In one of the embodiments, the vent hole runs through a bottom wall of the first mounting hole, and the vent groove is provided in the bottom wall and a side wall of the first mounting hole; and one end of the vent groove that is provided on the bottom wall of the first mounting hole extends to the vent hole, and one end of the vent groove that is provided on the side wall of the first mounting hole extends to an opening of the first mounting hole.

In one of the embodiments, the power supply assembly includes a matching portion, and the first mounting hole is provided on the matching portion.

In one of the embodiments, the first mounting hole is provided on one end of the matching portion in a first direction, and the matching portion, the communication member, and the mounting groove are provided in a second direction perpendicular to the first direction.

In one of the embodiments, the matching portion is further provided with a second mounting hole configured to mount the magnetic member, and the second mounting hole and the first mounting hole are separately provided on two ends of the matching portion in the first direction.

In one of the embodiments, the matching portion is provided with an electrode hole, and the electrode hole includes a positive electrode hole and a negative electrode hole; and the power supply assembly includes a positive pole mounted in the positive electrode hole and a negative pole mounted in the negative electrode hole.

In one of the embodiments, the power supply assembly includes a battery, and the battery is electrically connected to the airflow sensor.

In one of the embodiments, the power supply assembly further includes a circuit board; and the circuit board, the airflow sensor, and the battery are electrically connected.

An electronic vaporization device includes a vaporization assembly and the power supply assembly described in any of the foregoing embodiments; and the magnetic member is adsorbed and fixed to the vaporization assembly, and the vent groove is in air communication with the vaporization assembly.

In the power supply assembly and electronic vaporization device, the inner wall of the first mounting hole configured to mount the magnetic member is configured to provide the vent groove, so that the airflow sensor is in air communication with the vaporization assembly. In this way, a start airway does not need to be additionally provided for the airflow sensor on the power supply assembly, which saves space on the power supply assembly and is conducive to the miniaturization and flat design of a product.

To make the foregoing objects, features and advantages of the present utility model more comprehensible, detailed description is made to specific implementations of the present utility model below with reference to the accompanying drawings. In the following description, many specific details are provided to facilitate a full understanding of the present utility model. However, the present utility model may alternatively be implemented in other manners different from those described herein, and a person skilled in the art may make similar modifications without departing from the content of the present utility model. Therefore, the present utility model is not limited to the embodiments disclosed below.

In the description of the present utility model, it should be understood that directions or location relationships indicated by terms "center", "longitudinal", "transversely", "length", "width", "thickness", "upper", "lower", "front", "rear", "left", "right", "vertical", "horizontal", "top", "bottom", "inner", "outer", "clockwise", "counterclockwise" "axial direction", "radial direction" and "circumferential direction" are directions or location relationships shown based on the accompanying drawings, are merely used for the convenience of describing the present utility model and simplifying the description, but are not used to indicate or imply that a device or an element needs to have a particular direction or be constructed and operated in a particular direction, and therefore, cannot be understood as a limitation to the present utility model.

In addition, the terms "first" and "second" are used merely for the purpose of description, and shall not be construed as indicating or implying relative importance or implying a quantity of indicated technical features. Therefore, features defining "first" and "second" can explicitly or implicitly include at least one of the features. In description of the present utility model, "multiple" means at least two, such as two and three unless it is specifically defined otherwise.

In the present utility model, unless otherwise explicitly specified and defined, terms such as "mounted", "connected", "connection", and "fixed" should be understood in broad sense, for example, the connection may be a fixed connection, a detachable connection, or an integral connection; or the connection may be a mechanical connection or an electrical connection; or the connection may be a direct connection, an indirect connection through an intermediary, or internal communication between two elements or a mutual action relationship between two elements, unless otherwise specified explicitly. A person of ordinary skill in the art can understand specific meanings of the terms in the present utility model according to specific situations.

In the present utility model, unless otherwise explicitly specified and defined, the term "communication" refers to communication in terms of fluid, for example, the fluid may be air or liquid; and may be direct communication or indirect communication through an intermediary.

In the present utility model, unless explicitly specified or limited otherwise, a first characteristic "on" or "under" a second characteristic may be the first characteristic in direct contact with the second characteristic, or the first characteristic in indirect contact with the second characteristic by using an intermediate medium. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is right below the second feature or at an inclined bottom of the second feature, or may merely indicate that the horizontal position of the first feature is lower than that of the second feature.

It should be noted that, when a component is referred to as "being fixed to" or "being arranged on" another component, the component may be directly on the another component, or there may be an intermediate component. When one component is considered as "being connected to" another component, the component may be directly connected to the another component, or an intermediate component may simultaneously exist. The terms "vertical", "horizontal", "upper", "lower", "left", "right", and similar expressions used in this specification are merely used for an illustrative purpose, and do not represent the only implementation.

An embodiment of the present utility model provides an electronic vaporization device, which includes a power supply assembly and a vaporization assembly matched with the power supply assembly. The power supply assembly is electrically connected to the vaporization assembly, and is configured to supply power to the vaporization assembly. The vaporization assembly vaporizes a vaporization substrate by using electric energy provided in the power supply assembly, and generates an aerosol for a user to inhale.

Figure 2:
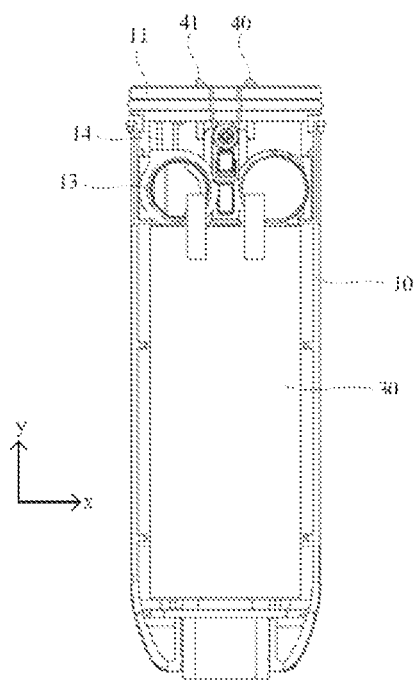
FIG. 2 is a front view of the power supply assembly shown in FIG. 1.
Figure 3:
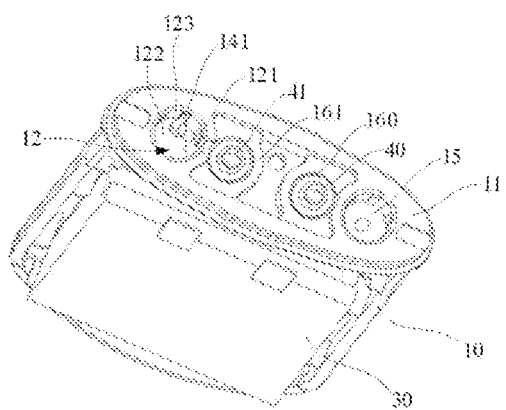
FIG. 3 is a schematic structural diagram of the power supply assembly shown in FIG. 1 from another perspective (a magnetic member is omitted)
Figure 4:
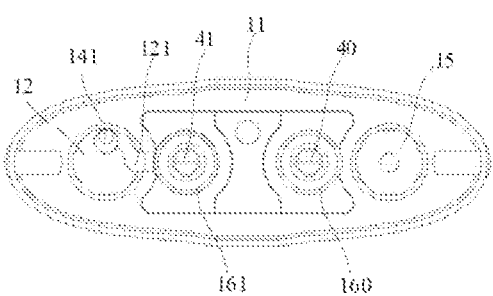
FIG. 4 is a top view of the power supply assembly shown in FIG. 1 (a magnetic member is omitted).

FIG. 1 is a schematic structural diagram of a power supply assembly according to an embodiment of the present utility model; FIG. 2 is a front view of the power supply assembly shown in FIG. 1; FIG. 3 is a schematic structural diagram of the power supply assembly shown in FIG. 1 from another perspective (a magnetic member 20 is omitted); and FIG. 4 is a top view of the power supply assembly shown in FIG. 1 (a magnetic member 20 is omitted). For the convenience of description, the accompanying drawings only show the structures related to the present utility model. Referring to FIG. 1 to FIG. 4, in this embodiment of the present utility model, the power supply assembly includes a magnetic member 20 of the power supply assembly and an airflow sensor. The power supply assembly is provided with a first mounting hole 12, and an inner wall of the first mounting hole 12 is provided with a vent groove 121 (referring to FIG. 3 or FIG. 4). The magnetic member 20 is mounted in the first mounting hole 12. The magnetic member 20 is configured to cause the power supply assembly to be adsorbed and fixed to the vaporization assembly when the vaporization assembly is connected to the power supply assembly. The airflow sensor is in air communication with the vent groove 121, and is configured to detect an airflow in the vent groove 121. When the user inhales and then a negative pressure is formed in the vent groove 121, the airflow sensor detects the airflow in the vent groove 121, thereby controlling the power supply assembly to supply power to the vaporization assembly; and when the user stops inhaling, the negative pressure in the vent groove 121 disappears, and the airflow sensor detects that no airflow passes through the vent groove 121, thereby controlling the power supply assembly to stop supplying power to the vaporization assembly. Optionally, a microphone can be used in the airflow sensor.

In the power supply assembly, the inner wall of the first mounting hole 12 configured to mount the magnetic member 20 is configured to provide the vent groove 121, so that the airflow sensor is in air communication with the vaporization assembly. In this way, a start airway does not need to be additionally provided for the airflow sensor on the power supply assembly, which saves space on the power supply assembly and is conducive to the miniaturization and flat design of a product.

In this embodiment of the present utility model, the power supply assembly further includes a mounting groove 13, and the airflow sensor is mounted in the mounting groove 13, so as to be in communication with the mounting groove 13 through the vent groove 121, so that the airflow sensor can detect the airflow in the vent groove 121.

Specifically, in an embodiment, the power supply assembly includes a communication member 14 arranged between the mounting groove 13 and the vent groove 121. In this way, the mounting groove 13 is in communication with the vent groove 121 by the communication member 14, so that the airflow sensor in the mounting groove 13 can detect the airflow in the vent groove 121.

More specifically, the communication member 14 is provided with a vent hole 141 (referring to FIG. 3 or FIG. 4). One end of the vent hole 141 is in communication with the mounting groove 13, an other end of the vent hole 141 is in communication with the first mounting hole 12, and the vent hole 141 is in communication with the vent groove 121. In this way, the vent groove 121 is in communication with the mounting groove 13 through the vent hole 141 on the communication member 14, so that the airflow sensor mounted in the mounting groove 13 can detect the airflow in the vent groove 121.

Further, the vent hole 141 runs through a bottom wall 122 of the first mounting hole 12, and the vent groove 121 is provided in the bottom wall 122 and a side wall 123 of the first mounting hole 12; and one end of the vent groove 121 that is provided on the bottom wall 122 of the first mounting hole 12 extends to the vent hole 141, and one end of the vent groove 121 that is provided on the side wall 123 of the first mounting hole 12 extends to an opening of the first mounting hole 12, so as to be in air communication with the vaporization assembly. In this way, the vent groove 121 is provided by using the bottom wall 122 and the side wall 123 of the first mounting hole 12, which is conducive to reduce the difficulty of forming the vent groove 121.

In this embodiment of the present utility model, the power supply assembly further includes a matching portion 11 configured to be matched with the vaporization assembly. The first mounting hole 12 is provided on the matching portion 11, so that the matching portion 11 and the vaporization assembly are adsorbed and fixed by the magnetic member 20 in the first mounting hole 12, so as to implement matching between the power supply assembly and the vaporization assembly. Further, the power supply assembly further includes a battery 30, and the battery 30 is electrically connected to the airflow sensor. In this way, when the user inhales and then a negative pressure is formed in the vent groove 121, the airflow sensor detects the airflow in the vent groove 121, thereby controlling the battery 30 to supply power to the vaporization assembly; and when the user stops inhaling, the negative pressure in the vent groove 121 disappears, and the airflow sensor detects that no airflow passes through the vent groove 121, thereby controlling the battery 30 to stop supplying power to the vaporization assembly.

Specifically, in an embodiment, the first mounting hole 12 is provided on one end of the matching portion 11 in a first direction, and the matching portion 11, the communication member 14, and the mounting groove 13 are provided in a second direction perpendicular to the first direction. In this way, the communication member 14 and the mounting groove 13 that is configured to mount the airflow sensor are arranged corresponding to the first mounting hole 12, that is, are arranged close to a side of the power supply assembly in the first direction (that is, the communication member 14 and the airflow sensor are offset), so as to avoid occupying a space in a middle area of the power supply assembly in the first direction. In addition, the communication member 14 occupies less space, so that there is more space for arranging other components (for example, the following circuit board, or the like), and a structure of the power supply assembly is more compact. In addition, the first mounting hole 12 is provided on one end of the matching portion 11 in the first direction, so that the vent groove 121 provided on the inner wall of the first mounting hole 12 is also provided on one end of the matching portion 11 in the first direction. In this way, the risk that condensate enters the airflow sensor through the vent groove 121 is reduced, and the risk that the airflow sensor fails is further reduced. It should be noted that the matching portion 11, the communication member 14, the mounting groove 13, and the battery 30 are sequentially arranged in the second direction. Certainly, other arrangement manners may also be used, which are not limited herein.

Specifically, in the embodiment shown in the accompanying drawings, the first direction is a width direction of the power supply assembly, such as an x direction shown in FIG. 1 and FIG. 2. The second direction is a length direction of the power supply assembly, such as a y direction shown in FIG. 1 and FIG. 2. That is, the first direction is a left-right direction in FIG. 4, and the second direction is a direction perpendicular to a paper surface in FIG. 4.

Further, the matching portion 11 is further provided with a second mounting hole 15 configured to mount the magnetic member 20, and the second mounting hole 15 is provided on an other end of the matching portion 11 in the first direction. That is, the first mounting hole 12 and the second mounting hole 15 are separately provided at two ends of the matching portion 11 in the first direction, and the first mounting hole 12 and the second mounting hole 15 are both mounted with magnetic members 20. In this way, the two magnetic members 20 are used to be simultaneously adsorbed and fixed to the vaporization assembly, which is conducive to improve the bonding strength of the power supply assembly and the vaporization assembly. Certainly, in other embodiments, more mounting holes configured to mount the magnetic member 20 may be provided on the matching portion 11, which is not limited herein.

Specifically, in an embodiment, the power supply assembly further includes a circuit board. The circuit board, the airflow sensor, and the battery 30 are electrically connected, so that when the airflow sensor detects the airflow in the vent groove 121, the circuit board controls the battery 30 to be conducted to the vaporization assembly, thereby supplying power to the vaporization assembly; and when the airflow sensor detects that no airflow passes through the vent groove 121, the circuit board controls the battery 30 to disconnect from the vaporization assembly, thereby stopping power supply to the vaporization assembly.

Specifically, in an embodiment, the matching portion 11 is further provided with an electrode hole, and the electrode hole includes a positive electrode hole 160 and a negative electrode hole 161. The power supply assembly includes a positive pole 40 mounted in the positive electrode hole 160 and a negative pole 41 mounted in the negative electrode hole 161 respectively, so that the positive pole 40 and the negative pole 41 are configured to implement the electrical connection between the power supply assembly and the vaporization assembly. Further, the positive pole 40 and the negative pole 41 are both electrically connected to the circuit board, that is, the battery 30 is electrically connected to the positive pole 40 and the negative pole 41 through the circuit board. In this way, when the matching portion 11 is matched with the vaporization assembly through the magnetic member 20, the positive pole 40 and the negative pole 41 are both electrically connected to the vaporization assembly, so that under the control of the circuit board, the electrical energy of the battery 30 can be conducted to the vaporization assembly through the positive pole 40 and the negative pole 41, and the vaporization assembly can vaporize the vaporization substrate by using the electrical energy.

Specifically, in an embodiment, the power supply assembly further includes a battery holder 10. The matching portion 11, the mounting groove 13, and the communication member 14 can all be provided on the battery holder 10, and both the battery and the battery 30 can be mounted on the battery holder 10.

In this embodiment of the present utility model, the vaporization assembly includes an air inlet channel that is in communication with the vent groove 121. In this way, when the user inhales, the air in the vent groove 121 enters the air inlet channel, thereby generating a negative pressure in the vent groove 121. In this case, the airflow sensor detects the airflow in the vent groove 121, so that an electronic control board controls the battery 30 to supply power to the vaporization assembly. The vaporization assembly vaporizes the vaporization substrate by using the electric energy and generates an aerosol, and the airflow in the air inlet channel carries the aerosol to flow, and the aerosol is finally inhaled by the user.

In this embodiment of the present utility model, the vaporization assembly is provided with a magnetic engagement member that can generate a magnetic effect with the magnetic member 20, so that the power supply assembly and the vaporization assembly are adsorbed and fixed to the magnetic engagement member through the magnetic member 20.

Optionally, the magnetic member 20 may be a magnet, and in this case, the magnetic engagement member may be a magnet or a substance that can be adsorbed by a magnet (for example, an iron block). Certainly, in other embodiments, the magnetic member 20 may not be a magnet, but a substance (for example, an iron block) that can be adsorbed by a magnet. In this case, the magnetic engagement member is a magnet.

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A power supply assembly, comprising:
   a first mounting hole configured to mount a magnetic member, an inner wall of the first mounting hole being provided with a vent groove; and
   an airflow sensor in air communication with the vent groove.

2. The power supply assembly of claim 1, wherein the power supply assembly is provided with a mounting groove and the airflow sensor is mounted in the mounting groove.

3. The power supply assembly of claim 2, wherein the power supply assembly comprises a communication member arranged between the mounting groove and the vent groove.

4. The power supply assembly of claim 3, wherein the communication member is provided with a vent hole, one end of the vent hole being in communication with the mounting groove, an other end of the vent hole being in communication with the first mounting hole, and
   wherein the vent hole is in communication with the vent groove.

5. The power supply assembly of claim 4, wherein the vent hole runs through a bottom wall of the first mounting hole, and the vent groove is provided on the bottom wall and a side wall of the first mounting hole, and
   wherein one end of the vent groove that is provided on the bottom wall of the first mounting hole extends to the vent hole, and one end of the vent groove that is provided on the side wall of the first mounting hole extends to an opening of the first mounting hole.

6. The power supply assembly of claim 3, wherein the power supply assembly comprises a matching portion, and
   wherein the first mounting hole is provided on the matching portion.

7. The power supply assembly of claim 6, wherein the first mounting hole is provided on one end of the matching portion in a first direction, and the matching portion, the communication member, and the mounting groove are provided in a second direction perpendicular to the first direction.

8. The power supply assembly of claim 6, wherein the matching portion is provided with a second mounting hole configured to mount the magnetic member, and
   wherein the second mounting hole and the first mounting hole are separately provided on two ends of the matching portion in a first direction.

9. The power supply assembly of claim 6, wherein the matching portion is provided with an electrode hole comprising a positive electrode hole and a negative electrode hole, and
wherein the power supply assembly comprises a positive pole mounted in the positive electrode hole and a negative pole mounted in the negative electrode hole.

10. The power supply assembly of claim 1, wherein the power supply assembly comprises a battery,
wherein the battery is electrically connected to the airflow sensor.

11. The power supply assembly of claim 10, further comprising:
a circuit board,
wherein the circuit board, the airflow sensor, and the battery are electrically connected.

12. An electronic vaporization device, comprising:
a vaporization assembly; and
the power supply assembly of claim 1,
wherein the magnetic member is adsorbed and fixed to the vaporization assembly, and
wherein the vent groove is in air communication with the vaporization assembly.

13. A power supply assembly, comprising:
a first mounting hole configured to mount a magnetic member, an inner wall of the first mounting hole being provided with a vent groove; and
a vent hole running through a bottom wall of the first mounting hole,
wherein a first end of the vent groove is provided on the bottom wall of the first mounting hole, the first end of the vent groove extending to the vent hole, and
wherein a second end of the vent groove is provided on a side wall of the first mounting hole, the second end of the vent groove extending to an opening of the first mounting hole.

14. The power supply assembly of claim 13, further comprising:
an airflow sensor in air communication with the vent groove, and
a mounting groove,
wherein the airflow sensor is mounted in the mounting groove.

15. The power supply assembly of claim 14, wherein the power supply assembly comprises a communication member arranged between the mounting groove and the vent groove.

16. The power supply assembly of claim 13, further comprising:
a second mounting hole configured to mount the magnetic member,
wherein the second mounting hole and the first mounting hole are separately provided.

17. A power supply assembly, comprising:
a first mounting hole configured to mount a magnetic member, an inner wall of the first mounting hole being provided with a vent groove; and
an airflow sensor in air communication with the vent groove,
wherein the vent groove is provided in a bottom wall and a side wall of the first mounting hole.

18. The power supply assembly of claim 17, further comprising:
an airflow sensor in air communication with the vent groove, and
a mounting groove,
wherein the airflow sensor is mounted in the mounting groove.

19. The power supply assembly of claim 18, wherein the power supply assembly comprises a communication member arranged between the mounting groove and the vent groove.

20. The power supply assembly of claim 17, further comprising:
a second mounting hole configured to mount the magnetic member,
wherein the second mounting hole and the first mounting hole are separately provided.

* * * * *